(12) United States Patent
Baur et al.

(10) Patent No.: US 8,748,047 B2
(45) Date of Patent: Jun. 10, 2014

(54) METHOD FOR OPERATING A FUEL CELL SYSTEM WITH A RECIRCULATION BLOWER ARRANGED IN A FUEL CIRCUIT THEREOF

(75) Inventors: Thomas Baur, Weilheim (DE); Cosimo Mazzotta, Ulm (DE); Andreas Knoop, Esslingen (DE)

(73) Assignee: Daimler AG, Stuttgart (DE)

( * ) Notice: Subject to any disclaimer, the term of this patent is extended or adjusted under 35 U.S.C. 154(b) by 774 days.

(21) Appl. No.: 12/921,854

(22) PCT Filed: Mar. 3, 2009

(86) PCT No.: PCT/EP2009/001482
§ 371 (c)(1),
(2), (4) Date: Nov. 16, 2010

(87) PCT Pub. No.: WO2009/112178
PCT Pub. Date: Sep. 17, 2009

(65) Prior Publication Data
US 2011/0053013 A1    Mar. 3, 2011

(30) Foreign Application Priority Data

Mar. 11, 2008   (DE) .......................... 10 2008 013 507

(51) Int. Cl.
*H01M 8/04* (2006.01)
*H01M 8/06* (2006.01)

(52) U.S. Cl.
USPC ............................ 429/413; 429/414; 429/429

(58) Field of Classification Search
USPC .................................................. 429/400–535
See application file for complete search history.

(56) References Cited

U.S. PATENT DOCUMENTS

| 5,753,383 | A | 5/1998 | Cargnelli et al. |
| 7,105,243 | B2 | 9/2006 | Morishima et al. |
| 2002/0004157 | A1 | 1/2002 | Keefer et al. |
| 2002/0150661 | A1* | 10/2002 | Elia et al. ...................... 426/523 |
| 2005/0112014 | A1 | 5/2005 | Shiromaru et al. |
| 2006/0099471 | A1 | 5/2006 | Ichikawa et al. |
| 2008/0014475 | A1* | 1/2008 | Leboe et al. .................... 429/13 |
| 2008/0187793 | A1 | 8/2008 | Owejan et al. |
| 2008/0233444 | A1* | 9/2008 | Yagi et al. ....................... 429/22 |
| 2009/0075128 | A1* | 3/2009 | Sadamoto et al. .............. 429/13 |

FOREIGN PATENT DOCUMENTS

| DE | 103 31 261 A1 | 1/2004 |
| DE | 10 2004 056 744 A1 | 8/2005 |
| DE | 10 2007 046 014 A1 | 4/2009 |
| WO | WO 2007/128007 A1 | 11/2007 |

OTHER PUBLICATIONS

International Search Report dated Jun. 3, 2009 and PCT/ISA/237 Form (Fifteen (15) pages).

* cited by examiner

*Primary Examiner* — Kenneth Douyette
*Assistant Examiner* — James Lee
(74) *Attorney, Agent, or Firm* — Crowell & Moring LLP

(57) ABSTRACT

In a method for operating a fuel cell system having recirculation blower arranged in a fuel cell circuit, fuel discharged from the anode exhaust is fed back to the inlet side of the fuel cell system via the recirculation blower. The direction of flow in the fuel return line is reversed in at least a portion of the return line, in an alternating manner.

17 Claims, 1 Drawing Sheet

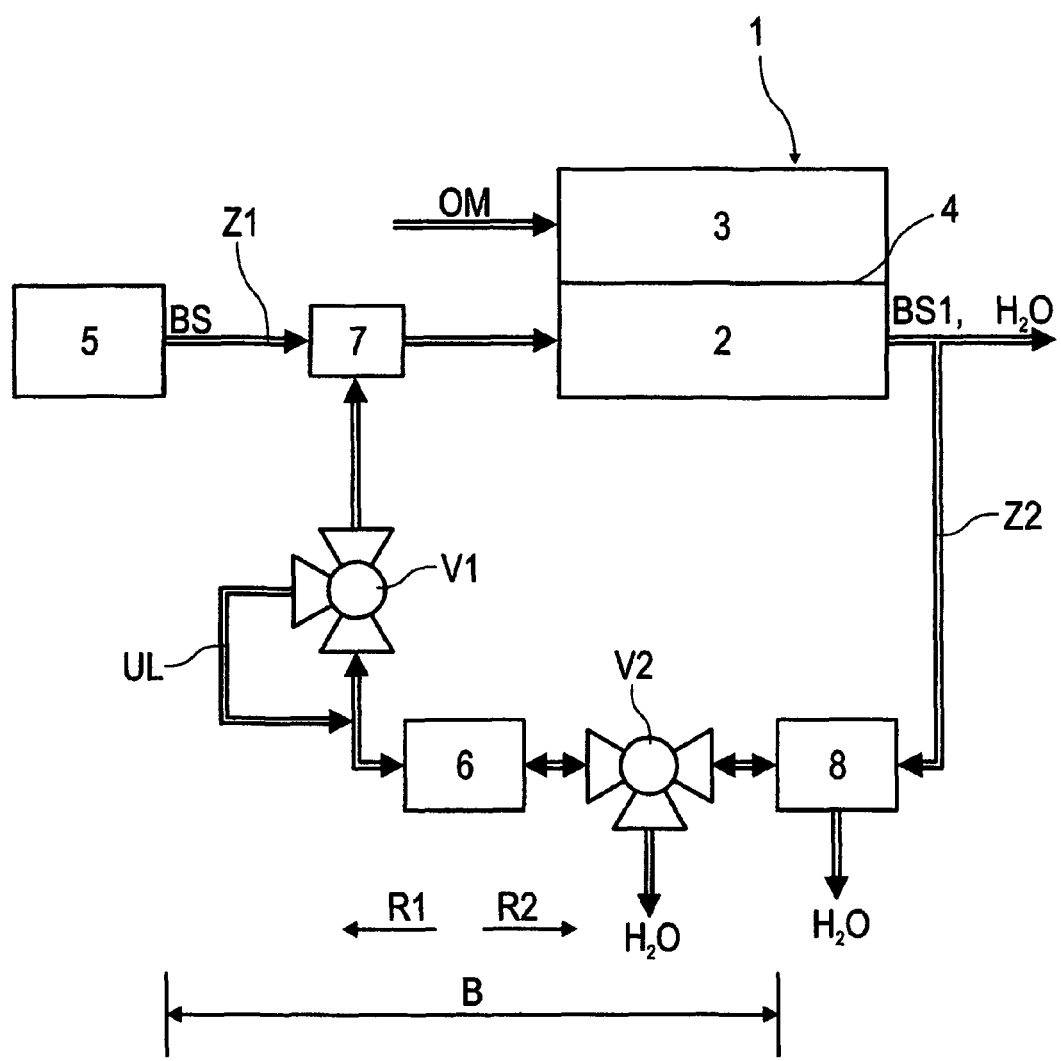

METHOD FOR OPERATING A FUEL CELL SYSTEM WITH A RECIRCULATION BLOWER ARRANGED IN A FUEL CIRCUIT THEREOF

This application is a national stage of PCT International Application No. PCT/EP2009/001482, filed Mar. 3, 2009, which claims priority under 35 U.S.C. §119 to German Patent Application No. 10 2008 013 507.0, filed Mar. 11, 2008, the entire disclosure of which is herein expressly incorporated by reference.

BACKGROUND AND SUMMARY OF THE INVENTION

The invention relates to a method for operating a fuel cell system with a recirculation blower arranged in a fuel circuit.

Conventionally, in the gas supply to a fuel cell system, oxidizing agent in the form of fresh air is compressed in a compressor and then cooled in a charge air cooler. In addition, the air flows into a humidifier module, in which it takes up water vapor from a cathode waste gas (flowing out on the cathode side) of the fuel cell or fuel cell stack. The humidified air is then passed into the fuel cell or the fuel cell stack, where it takes part in the electrochemical reaction.

Fuel in the form of hyperstoichiometric hydrogen is supplied to the anode of the fuel cell system, for example via a metering valve. Unreacted hydrogen and nitrogen and water vapor which have passed over to the cathode are compressed back to the pressure of the fresh gas by means of a blower (hereinafter, a recirculation blower) and fed back into the hydrogen feed stream.

Since water may freeze at low external temperatures, upon starting of the recirculation, mechanical functioning of blower components such as for example valves and/or pump devices, which are arranged in the above-described circuit, may be impaired, and possibly damaged. Conventionally such components at risk of frost are heated by additional heating elements in the event of a sub-freezing start.

As an alternative and/or in addition to the heating elements, in the event of an imminent sub-freezing start due to a low external temperature the recirculation blower serves to discharge water, for example in the form of water vapor. In this respect, the recirculation blower has a predetermined direction of rotation. However, as a result of the predetermined direction of rotation, the water may collect during the discharge process thereof, in recesses in the fuel return line for example due to differences in level. In this case, once the recirculation blower has been turned off the water in the fuel return line flows back, is not discharged and may freeze.

German patent document DE 10 2004 056 744 A1 discloses a fluid compressor, which ensures draining off of water via a discharge opening, in the case of water being sucked into a pump chamber and condensed therein. In the pump chamber, a base part is arranged in a lower portion. Two rotors, which are arranged in the pump chamber, are turned, so as to pressurize the water in the pump chamber. The discharge opening, which is arranged in the base part, expels pressurized water out of the pump chamber. The base part defines a guide face, which extends away from the discharge opening. The guide face is inclined downwards in such a way that water moves downwards over the guide face to the expulsion opening as a result of gravity. A disadvantage is that, when such a fluid compressor is used, there is again a risk of water freezing in recesses in the fuel return line.

The use of a recirculation blower in an anode recirculation loop of a fuel cell system is well known from the prior art. Such devices are disclosed for example in Published U.S. Patent Application Nos. 2005/112014 A1 and 2002/004157 A1, and in U.S. Pat. No. 5,753,383.

International Patent Application WO 2007/128007 A discloses an anode recirculation system which can avoid the use of a recirculation blower by a method of controlling the pressure at a volume for off gas in correspondence with the anode outlet and optionally with the anode inlet. The idea is to store the anode off gas until a pressure is reached which is high enough to feed the anode off gas back to the anode outlet or in an alternative embodiment to the anode inlet. If such a pressure is reached a valve for the hydrogen supply is closed and valves to fed back the anode off gas to the anode outlet or inlet is opened. If the pressure falls under a predetermined valve the hydrogen supply valve is opened again.

One object of the invention is therefore to provide a method and a device for operating a fuel cell system with a recirculation blower arranged in the fuel return line, which recirculation blower in particular overcomes the disadvantages indicated in the prior art and is inexpensive to produce.

This and other objects and advantages are achieved by the method according to the invention for operating a fuel cell system with a recirculation blower arranged in a fuel circuit of the fuel cell system, by means of which fuel issuing on the anode side is fed back to the fuel cell system on the inlet side. According to the invention, fuel issuing on the anode side is conveyed in a fuel return line, at least in places, in alternating flow directions, making possible a simple separation of water from the gaseous fuel and thus drying of the fuel. The method is preferably implemented in a control unit for the fuel cell system as a switch-off procedure in preparation for a sub-freezing start. The method is carried out repeatedly at low external temperatures and in particular before a "sub-freezing start", the fuel cell system being switched off in order to discharge water present in the fuel return line. In this case the discharge of water, which cannot for example overcome level differences and/or recesses (i.e., "dead zones") in the flow direction returning the fuel, is made possible by changing, in particular reversing, the flow direction of the returned fuel in the fuel return line.

Therefore, the recirculation blower being controllable in such a way that the fuel issuing on the anode side and returned may be conveyed in the fuel return line at least in places in alternating flow directions. In this case, it is ensured in the fuel return line by way of suitable means (for example non-return valve, shut-off valve or separator) that the fuel issuing on the anode side and conveyed in the fuel return line is not returned to the anode outlet.

Preferably, therefore, only one or more individual zones between components in the fuel return line are operated with alternating flow directions. For example, zones between the recirculation blower and a separator connected upstream thereof are flowed through alternately in both flow directions by the returned fuel.

Conveniently the excess water or water vapor present in liquid phase is discharged from the fuel return line by means of a separator arranged in the fuel return line. The separator preferably promotes a separation procedure in both flow directions (bidirectional) of the fuel. By discharging water from the fuel circuit, in particular from the fuel return line, the risk of water freezing for example in recesses in the fuel return line is reliably avoided. In this way, the use of additional heating elements to protect components at risk of frost, such as for example valves and/or pump devices, in the fuel return line at low external temperatures is not necessary. The separator is preferably arranged upstream of the recirculation blower in the fuel return line in the returning flow direction of the fuel.

In one possible embodiment, the direction of rotation of the recirculation blower is changed (in particular, reversed) to reverse the flow direction of the fuel conveyed in the fuel return line. In one possible configuration of the method according to the invention, the direction of rotation of the recirculation blower is changed (reversed) for the discharge of water, by an electronic drive controller and/or via a transmission, such that the passage direction is likewise reversed.

In order to achieve reversal of the flow direction of the fuel in the fuel return line, it is also possible to adjust the vane geometry of a rotor arranged in the recirculation blower, by an electric drive. In this case the direction of rotation of the recirculation blower is preferably maintained.

Alternatively, in the case of a switched-off (in particular stopped) recirculation blower and simultaneous opening of a purge valve arranged in a fuel return line, backwards flow of the gas stream in the fuel return line is achieved, wherein the water is drained off to the outside via the purge valve.

Conveniently, during reversal of the flow direction in the fuel return line, and thus during discharge of the water, an ejector arranged in the fuel circuit of the fuel cell, in which ejector a given proportion of the returned fuel is recirculated, is bypassed by means of a bypass line and preferably put out of operation. In this way, during reversal of the flow direction no further fuel (in particular hydrogen) is fed via the fuel feed line into the fuel circuit, whereby no driving force acts or is able to act on the ejector.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic representation of a device for operating a fuel cell system with a recirculation blower arranged in a fuel circuit of the fuel cell system.

DETAILED DESCRIPTION OF THE DRAWINGS

FIG. 1 shows a portion of a device for operating a fuel cell system with a fuel cell 1. Alternatively, the fuel cell system may comprise a fuel cell pack or a fuel cell stack (not shown).

The fuel cell 1 consists of an anode 2 and a cathode 3, an electrolyte membrane 4 being arranged between anode 2 and cathode 3.

On the anode side, a reservoir 5 is connected upstream of the fuel cell 1 for supplying the latter with fuel BS (in particular, hydrogen), via a fuel feed line Z1 leading from the reservoir 5 into the anode 2. On the anode waste gas side, a recirculation blower 6 is arranged in a fuel return line Z2 which is connected to the fuel feed line Z1 by means of an ejector 7, such as a suction jet pump.

The fuel BS is conveyed via the fuel feed line Z1 by means of the ejector 7 into the anode 2 of the fuel cell 1 and reacts therein in part with an oxidizing agent OM (in particular, fresh air) supplied by the cathode 3. Water $H_2O$ arises as reaction product and an electrical voltage is generated. Any unused or unreacted fuel BS1 is then passed into the fuel return line Z2.

It is significant for the method according to the invention that the volumetric flow rate of the fuel BS supplied to the anode 2 is relatively greater than the volumetric flow rate reacted in the anode 2. The unreacted fuel BS1 is returned via the fuel return line Z2 by means of a recirculation blower 6 and conveyed on the anode inlet side into the fuel feed line Z1 via the ejector 7.

The method according to the invention provides that, to prevent water from freezing in the fuel return line Z2 at low temperatures, the fuel BS1 returned in the fuel return line Z2 is conveyed in places in alternating flow directions R1, R2, which enables discharge of water for example via a separator 8 arranged in the fuel return line Z2. Thus, a sub-freezing start, which may be necessary at low temperatures, may be prepared for by performing the method according to the invention from time to time. In this case, the fuel BS1 issuing on the anode outlet side is conveyed in places, i.e., in individual or a plurality of zones B between the separator 8 and the ejector 7 or between the separator 8 and the recirculation blower 6 in the fuel return line Z2, in alternating flow directions R1, R2 (forwards and backwards).

The zone B of alternating flow directions R1 and R2 may for example be formed by a line section from the separator 8 via a bypass line UL bypassing the ejector 7 back to the separator 8, the excess water $H_2O$ or water vapor being drained off via the separator 8. In this case, a control valve V1, which takes the form for example of a three-way valve, is arranged upstream of the ejector 7 in the fuel return line Z2 to enable the bypass line UL to branch off.

Various modes of operation are possible for reversing the flow direction R1 in the fuel return line.

A first possible embodiment provides adjustable vane geometry, not described in any greater detail, for a rotor arranged in the recirculation blower 6. In this case, the individual vanes of the rotor are adjusted in such a way that, while maintaining the same direction of rotation of the recirculation blower 6, an opposing gas stream is generated in flow direction R2. The fuel BS1 then flows contrary to the fuel-returning flow direction R1 in the flow direction R2 and is fed back to the separator 8, in order for the water $H_2O$ or water vapor contained in the returned fuel BS1 to be separated from the fuel BS1.

As an alternative to adjustment of the rotor blades while maintaining the same direction of rotation of the recirculation blower 6, it is possible merely to change, in particular reverse, the direction of rotation of the recirculation blower 6.

In a further alternative, the recirculation blower 6 is switched off, wherein as a result of the overpressure in the fuel return line Z2 a purge valve V2 arranged upstream therein is opened and the flow direction is reversed from R1 to R2 and the water $H_2O$ or the water vapor is drained off via the purge valve V2. In this case, the purge valve V2 may be arranged in the fuel return line Z2 or at another suitable point between separator 8 and recirculation blower 6.

During reversal of the flow direction R1 of the fuel BS1 to flow direction R2, the ejector 7 is bypassed by means of the bypass line UL, in that the control valve V1 opens the bypass line UL and shuts off feed to the ejector 7. As a result of said bypassing, the fuel BS1 is conveyed back via the recirculation blower 6 to the separator 8 in direction R2. In this case, the fuel BS1 is conveyed in alternating flow directions R1, R2 and thus dried until no more water $H_2O$ or water vapor can be discharged via the separator 8 or the purge valve V2. Then the bypass line UL is shut off and the feed line to the ejector 7 is opened again by way of the control valve V1. If the fuel cell system is brought back into operation, the ejector 7 feeds the dried fuel BS1 to the fuel feed line Z1.

In one possible embodiment the method according to the invention is implemented as a switch-off procedure in a control unit. To carry out the method for discharging the water, the fuel cell system 1 is deactivated, i.e. in particular the fuel cell feed is deactivated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Fuel cell
2 Anode
3 Cathode
4 Electrolyte membrane
5 Reservoir
6 Recirculation blower
7 Ejector
8 Separator
Z1 Fuel feed line
Z2 Fuel return line
BS Fuel
BS1 Returned fuel
OM Oxidizing agent
UL Bypass line
R1,R2 Flow directions (forwards, backwards)
V2 valve

The invention claimed is:

1. A method for operating a fuel cell system having a recirculation blower and a fuel cell arranged in a fuel circuit; wherein:
fuel issuing on an outlet side of an anode of the fuel cell is fed back to an inlet side of the anode, via the recirculation blower; and
the fuel issuing on the outlet side of the anode of the fuel cell is conveyed in a fuel return line, at least in places, in alternating flow directions, wherein the fuel is not conveyed to the fuel cell during the conveyance of the fuel in alternating directions.

2. The method as claimed in claim 1, wherein water or water vapor contained in the fuel is separated in the fuel return line upstream of the recirculation blower relative to a fuel returning flow direction.

3. The method as claimed in claim 1, wherein a flow direction of the fuel conveyed in the fuel return line is reversed by changing a direction of rotation of the recirculation blower.

4. The method as claimed in claim 1, wherein a flow direction of the fuel in the fuel return line is reversed by adjusting vane geometry of a rotor arranged in the recirculation blower, while maintaining the same direction of rotation of the recirculation blower.

5. The method as claimed in claim 1, wherein a flow direction of the fuel conveyed in the fuel return line is reversed by opening a purge valve arranged in the fuel return line when the recirculation blower is off.

6. The method as claimed in claim 1, wherein, when a flow direction of the fuel in the fuel return line is reversed, an ejector arranged in the fuel circuit is bypassed via a bypass line.

7. The method as claimed in claim 1, wherein during operation with alternating flow directions of the issuing fuel in the fuel return line, a fuel feed line for the fuel is shut off on the inlet side of the anode.

8. The method of claim 1, wherein the conveyance of the fuel in alternating directions involves repeatedly conveying fuel towards either the inlet or outlet side of the anode and then in an opposite flow direction toward either the outlet or the inlet side of the anode.

9. The method of claim 1, wherein
the fuel issuing on the outlet side of the anode is fed back to the inlet side of the anode via the recirculation blower, a fuel return line, and a fuel supply line,
the fuel return line is coupled between where the fuel issues on the anode side of the fuel cell and the fuel supply line, and
the recirculation blower is located in the fuel return line.

10. A method for operating a fuel cell system having a recirculation blower and a fuel cell having an anode arranged in a fuel circuit, the method comprising:
feeding fuel exiting an outlet of the anode back to an inlet of the anode, via the recirculation blower, a fuel return line, and a fuel supply line, wherein the fuel return line is coupled between the outlet of the anode and the fuel supply line, and the recirculation blower is located in the fuel return line; and
conveying the fuel exiting the outlet of the anode in alternating flow directions in at least in places in the fuel return line, wherein fuel is not conveyed to the outlet of the anode during the conveyance of the fuel in alternating directions, wherein the conveyance of the fuel in the alternating flow directions is performed when the fuel cell is shutdown.

11. The method as claimed in claim 10, wherein water or water vapor contained in the fuel is separated in the fuel return line upstream of the recirculation blower relative to a fuel returning flow direction.

12. The method as claimed in claim 10, wherein a flow direction of the fuel conveyed in the fuel return line is reversed by changing a direction of rotation of the recirculation blower.

13. The method as claimed in claim 10, wherein a flow direction of the fuel in the fuel return line is reversed by adjusting vane geometry of a rotor arranged in the recirculation blower, while maintaining the same direction of rotation of the recirculation blower.

14. The method as claimed in claim 10, wherein a flow direction of the fuel conveyed in the fuel return line is reversed by opening a purge valve arranged in the fuel return line when the recirculation blower is off.

15. The method as claimed in claim 10, wherein, when a flow direction of the fuel in the fuel return line is reversed, an ejector arranged in the fuel circuit is bypassed via a bypass line.

16. The method as claimed in claim 10, wherein during conveyance of the fuel in alternating flow directions in the fuel return line, the fuel supply line is shut off on the inlet of the anode.

17. The method of claim 10, wherein the conveyance of the fuel in alternating directions involves repeatedly conveying fuel towards either the inlet or outlet of the anode and then in an opposite flow direction toward either the outlet or the inlet of the anode.

* * * * *